US009986478B2

(12) United States Patent
Singh et al.

(10) Patent No.: US 9,986,478 B2
(45) Date of Patent: May 29, 2018

(54) ENHANCED WI-FI-CELLULAR MOBILITY

(71) Applicant: Apple Inc., Cupertino, CA (US)

(72) Inventors: Ajoy K. Singh, Milpitas, CA (US);
Shivesh Makharia, San Jose, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 14/486,876

(22) Filed: Sep. 15, 2014

(65) Prior Publication Data
US 2016/0080995 A1     Mar. 17, 2016

(51) Int. Cl.
*H04W 36/14* (2009.01)
*H04W 36/00* (2009.01)

(52) U.S. Cl.
CPC ........ *H04W 36/14* (2013.01); *H04W 36/0033* (2013.01)

(58) Field of Classification Search
CPC .............................. H04W 36/14; H04W 76/02
USPC ........................................................ 370/331
See application file for complete search history.

(56) References Cited

U.S. PATENT DOCUMENTS

| | | | | |
|---|---|---|---|---|
| 8,867,490 B1* | 10/2014 | Krishna | ............ | H04W 36/0011 370/310 |
| 8,879,530 B2 | 11/2014 | Gu | | |
| 2008/0205342 A1* | 8/2008 | Radhakrishnan | . | H04W 36/0033 370/331 |
| 2008/0316972 A1* | 12/2008 | Shaheen | ........... | H04W 36/0033 370/331 |
| 2009/0156213 A1* | 6/2009 | Spinelli | ................. | H04W 36/36 455/436 |
| 2009/0285175 A1* | 11/2009 | Nix | ........................ | H04L 29/125 370/331 |
| 2012/0269167 A1 | 10/2012 | Velev et al. | | |
| 2013/0107863 A1* | 5/2013 | Faccin | ............. | H04W 36/0022 370/331 |
| 2013/0159535 A1* | 6/2013 | Zhang | ............... | H04W 36/0033 709/227 |
| 2013/0272269 A1* | 10/2013 | Srivastava | ............ | H04W 36/30 370/332 |
| 2013/0279470 A1* | 10/2013 | Sen | ........................ | H04W 48/18 370/331 |
| 2014/0071907 A1* | 3/2014 | Roeland | ............. | H04W 76/021 370/329 |
| 2014/0173123 A1* | 6/2014 | Graessley | ........... | H04L 61/6086 709/228 |

(Continued)

*Primary Examiner* — Mang Yeung
*Assistant Examiner* — Peter G Solinsky
(74) *Attorney, Agent, or Firm* — Meyertons Hood Kivlin Kowert & Goetzel, P.C.; Jeffrey C. Hood; Brian E. Moore

(57) ABSTRACT

In some embodiments, a user equipment device (UE) may be configured to perform handover of a communication session from a first packet data network (PDN) to a second PDN. The UE may include a radio and processing circuitry coupled to the radio and configured to interoperate with the radio. The radio may include one or more antennas for performing wireless communications over at least a first packet data network (PDN) (i.e., packet-switched network) and a second PDN. The UE may be configured to communicate over the first PDN according to first context information that was assigned to the UE and initiate a handover operation from the first PDN to the second PDN. In response to initiating the handover operation, the UE may communicate over the second PDN using the first context information for at least a first time duration.

20 Claims, 9 Drawing Sheets

(56) References Cited

U.S. PATENT DOCUMENTS

| | | | |
|---|---|---|---|
| 2014/0213219 A1 | 7/2014 | Mohebbi | |
| 2014/0242991 A1* | 8/2014 | Yanover | H04W 36/22 |
| | | | 455/436 |
| 2014/0321328 A1* | 10/2014 | Zuniga | H04W 8/06 |
| | | | 370/254 |
| 2014/0328190 A1* | 11/2014 | Lord | H04W 24/08 |
| | | | 370/252 |
| 2015/0003415 A1* | 1/2015 | Muley | H04W 36/0022 |
| | | | 370/331 |
| 2015/0011226 A1* | 1/2015 | De Sousa | H04W 24/02 |
| | | | 455/446 |
| 2015/0020168 A1* | 1/2015 | Faccin | H04W 12/06 |
| | | | 726/4 |
| 2015/0172981 A1* | 6/2015 | Janakiraman | H04W 36/14 |
| | | | 370/241 |
| 2015/0382399 A1* | 12/2015 | Jechoux | H04W 88/06 |
| | | | 455/552.1 |
| 2016/0080981 A1* | 3/2016 | Wang | H04W 36/0011 |
| | | | 370/331 |

* cited by examiner

ENHANCED WI-FI-CELLULAR MOBILITY

FIELD OF THE INVENTION

The present application relates to wireless communication, and more particularly to enhancing handover of a communication session between packet data networks.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, etc.

User equipment devices (UEs) (e.g., mobile telephones or smart phones, portable gaming devices, laptops, wearable devices, PDAs, tablets, portable Internet devices, music players, data storage devices, or other handheld devices, etc.) may have multiple radio interfaces that enable support of multiple radio access technologies (RATs) as defined by the various wireless communication standards (LTE, LTE-A, Wi-Fi, etc.). The radio interfaces may be used by various applications and the presence of the multiple radio interfaces may necessitate the UE to implement mobility solutions to seamlessly handover applications (i.e., communication sessions) from one radio interface to another radio interface (e.g., from Wi-Fi to LTE/LTE-A) without impacting the end-to-end performance of the application (i.e., without interrupting the communication session).

For example, 3GPP defines signaling protocols to handover a specific access point name (APN) from a cellular radio to a Wi-Fi radio by maintaining the same internal internet protocol (IP) address. The protocols are based on the general packet radio service (GPRS) tunneling protocol (GTP)—S2b mobility (SMOG) and S2a mobility (SaMOG). Further, 3GPP defines solutions for both IPv4 and IPv6 and 3GPPP solutions are defined in 3GPP technical standard (TS) 23.402 and 3GPP TS 23.401.

Further, the current 3GPP standard also defines a mechanism for IP address continuity when handover occurs from a Wi-Fi radio interface to a cellular radio interface. However, the current standard does not ensure seamless (i.e., without interruption and/or disconnect of the communication session) handover of real time sessions when UEs handover from Wi-Fi coverage to cellular coverage. The current 3GPP standard specifies that the UE reconfigures prefix and interface identifier (IID) information over the cellular radio interface when the UE moves from the Wi-Fi (or WLAN) coverage area to the cellular radio coverage area. The handover starts with the UE establishing a packet data network (PDN) connection with the cellular network for the specific APN for which the handover is desired. The UE sends a PDN connectivity message by setting a handover flag. Then, after establishing the PDN connection with the cellular network for the specific APN, the UE uses router solicitation (RS) and router advertisement (RA) messages to acquire IPv6 prefix and IID information from the packet gateway (PGW). Accordingly, the UE reconfigures the IPv6 address prefix and IID information. Thus, the UE may then resume the session over the cellular network.

For real time sessions, the current 3GPP standard may result in service interruptions because the UE is unable to send data and may not recognize received data once the UE sends the PDN connectivity message. Additionally, the UE will not be able to resume the session until the UE is fully reconfigured to use the cellular network. Specifically, the UE will be unable to send uplink (UL) data until the IPv6 address is reconfigured and the UE will discard downlink (DL) data received during the reconfiguration because it will no longer recognize the IPv6 address associated with the Wi-Fi connection. Additional delays may result from the RA being lost over the best effort lossy link used in acquiring the PDN connection which may result in data being discarded on the cellular interface of the UE as the reconfiguration is not yet complete. Therefore, improvements in the field would be desirable.

SUMMARY OF THE INVENTION

Embodiments are presented herein of, inter alia, enhanced handover of a communication session between packet data networks, and of devices that implement the methods.

One embodiment relates to a user equipment device (UE) comprising a radio and processing circuitry coupled to the radio and configured to interoperate with the radio. The radio may include one or more antennas for performing wireless communications over at least a first packet data network (PDN) (i.e., packet-switched network) and a second PDN. Each PDN may operate according to at least one radio access technology (RAT). The UE may perform voice and/or data communications, as well as the methods described herein.

In one set of embodiments, the UE (i.e., a wireless communication device) may communicate over the first PDN according to first context information that was assigned to the UE. The first context information may include IPv6 address prefix and IID information for the first PDN. The UE may initiate a handover operation from the first PDN to the second PDN. In response to initiating the handover operation, the UE may communicate over the second PDN using the first context information for at least a first time duration.

In further embodiments, the UE may activate acquisition of second context information usable by the UE for communication over the second PDN in response to initiation of the handover operation. The UE may establish connectivity over the second PDN in response to the initiation of the handover operation. Accordingly, the UE may conduct the communications (i.e., communication session or data session) over the second PDN in response to establishment of connectivity over the second PDN. In an embodiment, the first time duration may include a time period for the UE to acquire the second context information for communication over the second PDN. Additionally, the UE may compare the first context information with the second context information. If the first context information and the second context information are the same, the UE may continue using the first context information during the communications. If the first context information and the second context information are not the same, the UE may continue the communications using the second context information.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
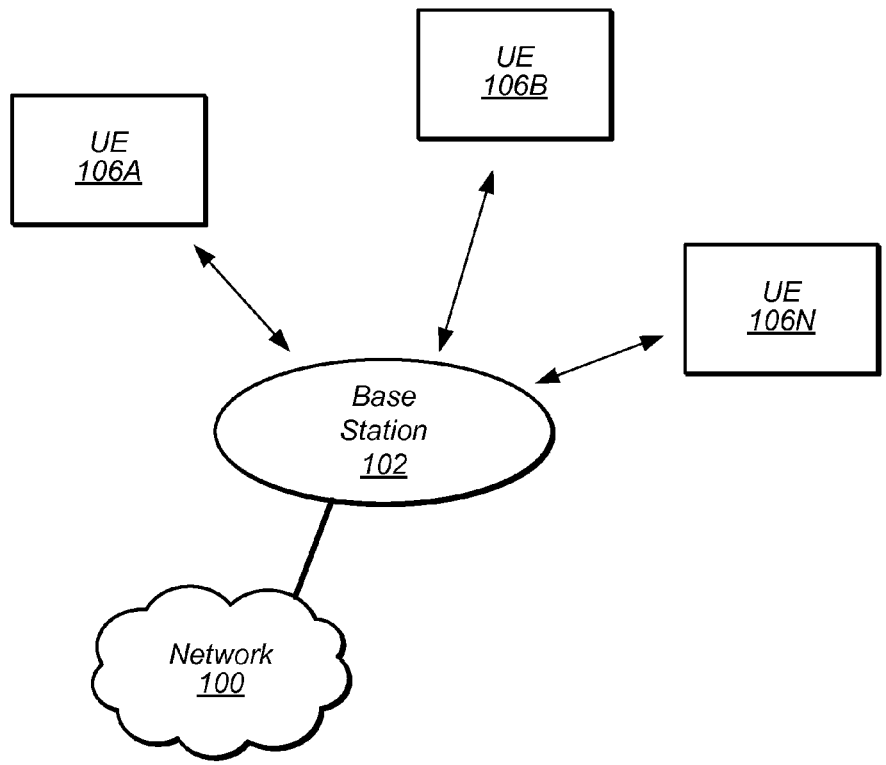
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission
RX: Reception
UMTS: Universal Mobile Telecommunication System
LAN: Local Area Network
WLAN: Wireless LAN
iWLAN: Interworking-wireless LAN
HD: Interface Identifier
APN: Access Point Name
GPRS: General Packet Radio Service
GTP: GPRS Tunneling Protocol
PDN: Packet Data Network
PGW: PDN Gateway
SGW: Serving Gateway
ePDGW: Evolved PDN Gateway
WAG: WLAN access gateway
RA: Router Solicitation
RS: Router Advertisement
RAT: Radio Access Technology
iRAT: Inter-Radio Access Technology Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
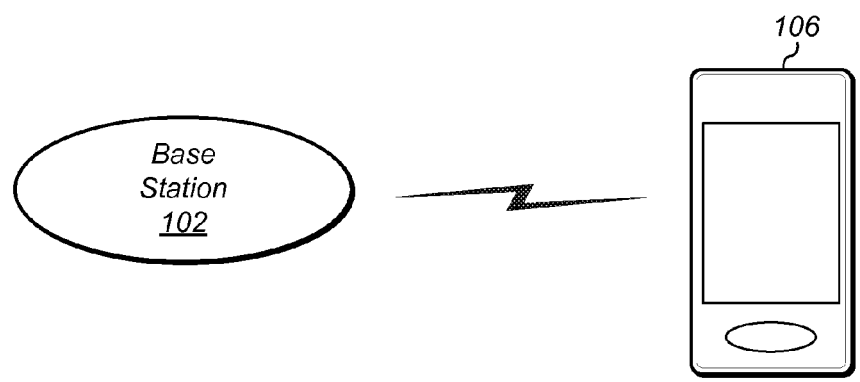
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved UL and DL decoupling methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
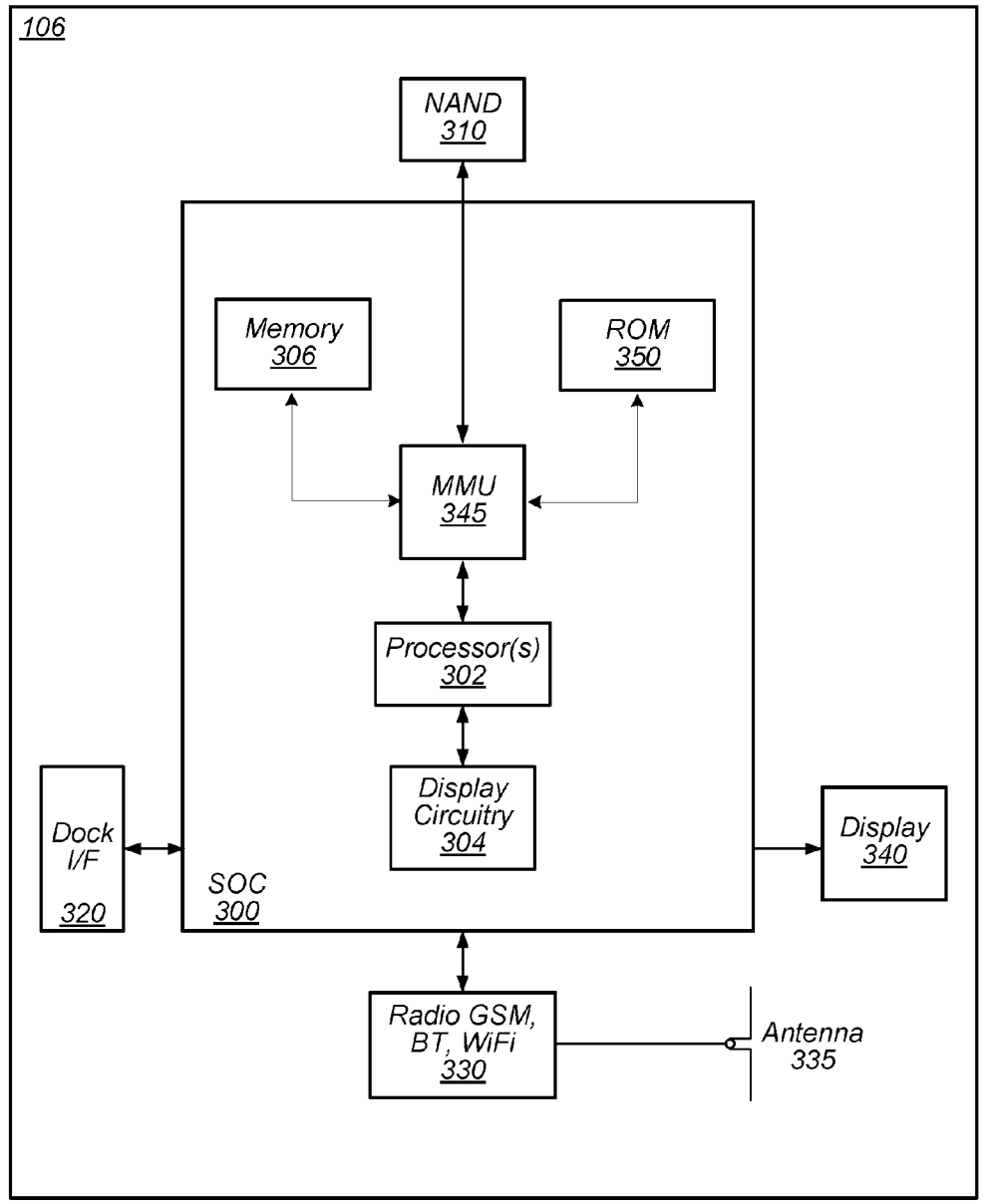
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 345, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 345 may be configured to perform memory protection and page table translation or set up. In some embodiments, the MMU 345 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for optimized handling of CSFB. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components as shown in FIG. 3, to implement optimized CSFB handling according to various embodiments disclosed herein.

Figure 4:
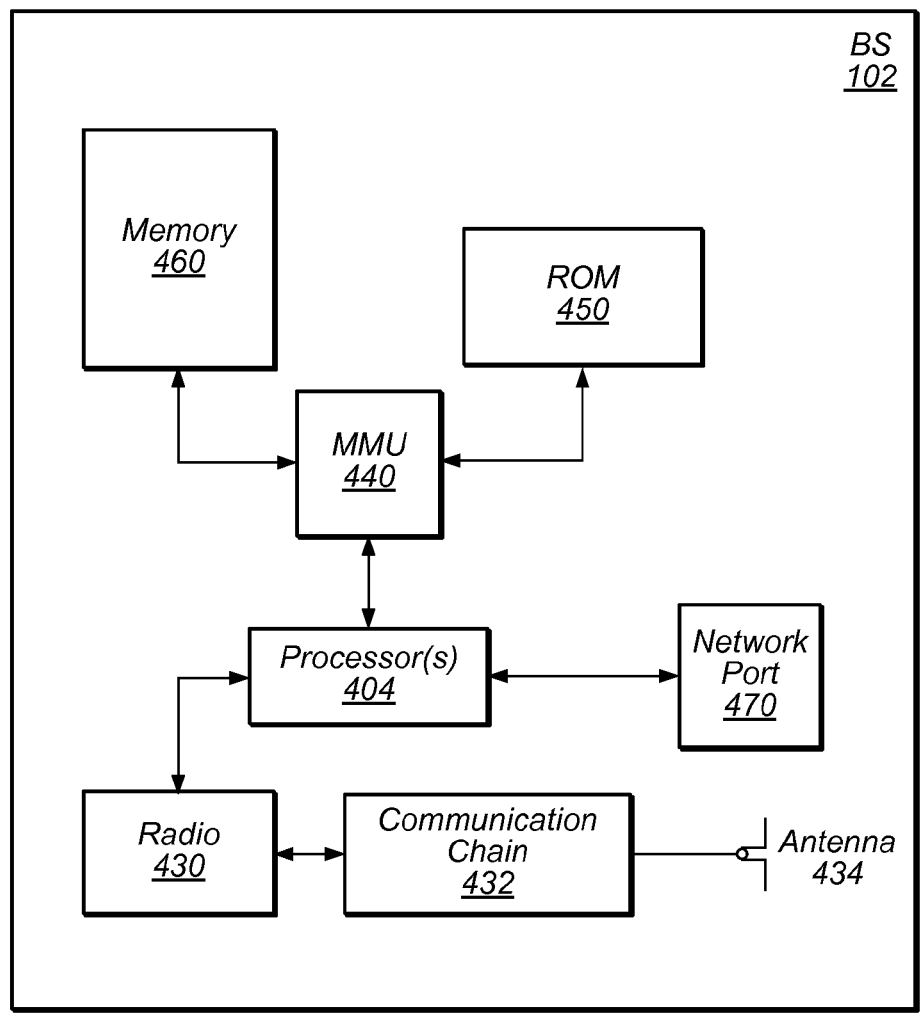
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein for improved CSFB handling, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5A:
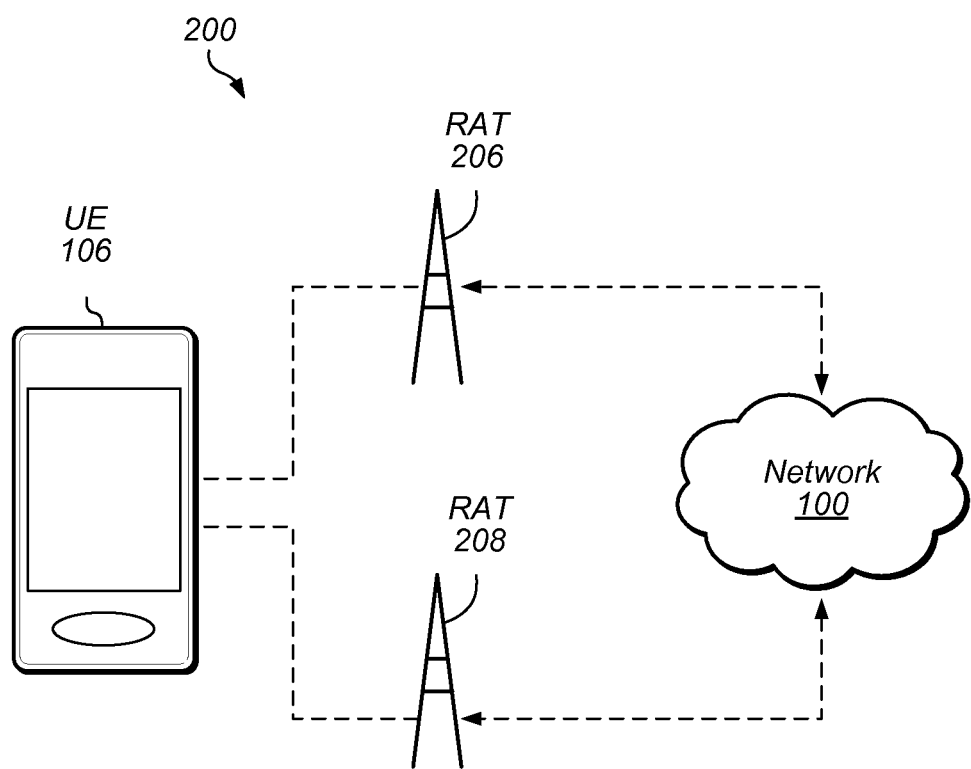
FIGS. 5A-5B illustrate wireless communication systems in accordance with some embodiments.
Figure 5B:
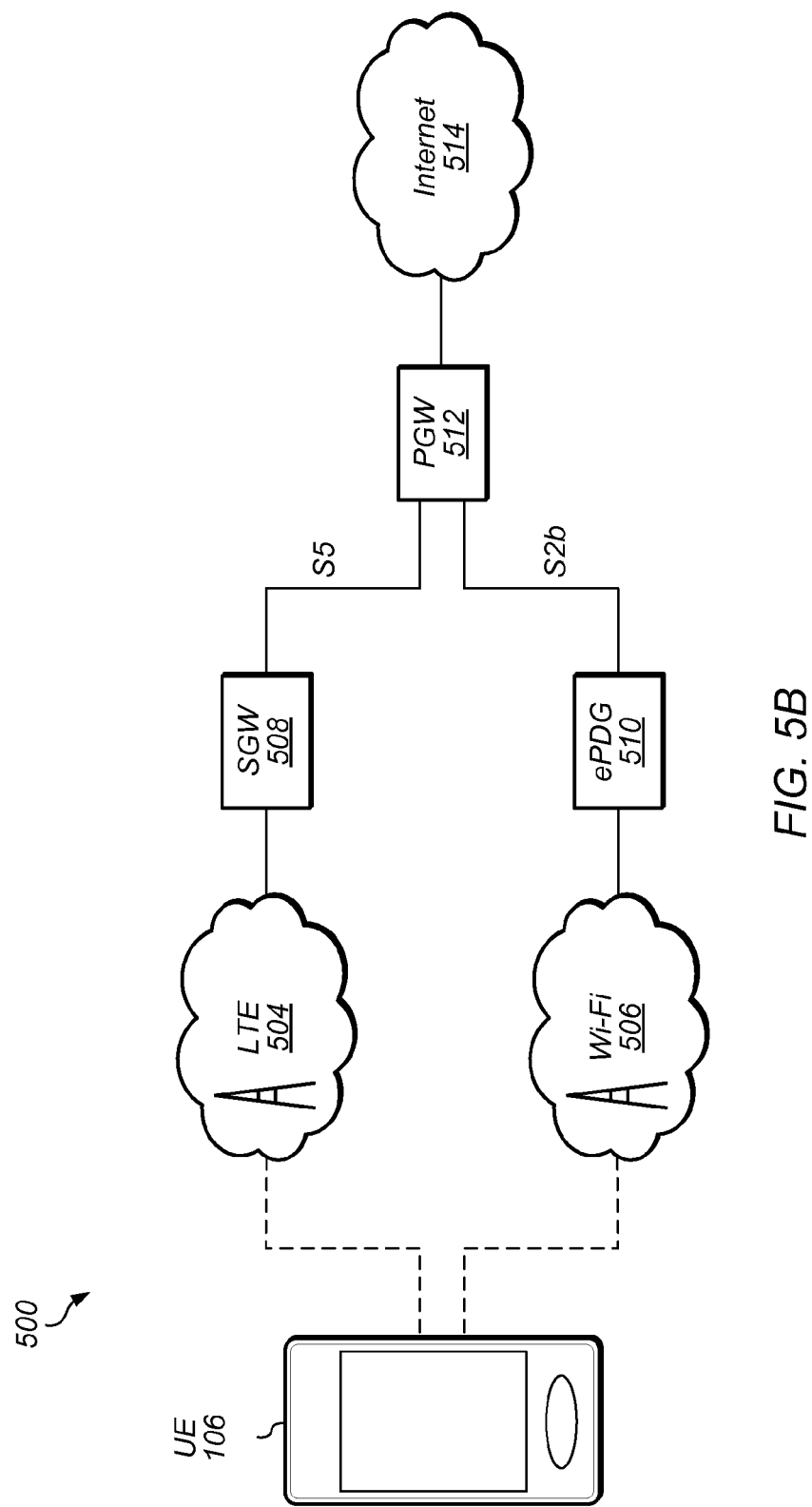

FIGS. 5A-5B—Communication Systems

FIGS. 5A-5B illustrate exemplary (and simplified) wireless communication systems. It is noted that the systems of FIGS. 5A-5B are merely examples of possible systems, and embodiments may be implemented in any of various systems, as desired.

As shown, the exemplary wireless communication system 200 shown in FIG. 5A may include the UE 106 which may be configured to establish a connection to a radio access network implementing a first radio access technology (RAT), such as RAT 206 and a radio access network implementing a second RAT, such as RAT 208. In some instances, UE 106 may have concurrent network connections to both RAT 206 and RAT 208. Additionally or alternatively, in some instances, UE 106 may transition from RAT 206 to RAT 208, or vice versa, such as in response to moving in and out of a coverage area of RAT 206 and/or RAT 208. UE 106 may accordingly include multiple physical radio interfaces, each of which may be configured to support communication via one or more respective RATs as described above. For example, UE 106 may include a first physical interface that may be configured to support communication via RAT 206 and a second physical interface that may be configured to support communication via RAT 208. Note that each physical interface may be considered a sub-radio and may be included in a radio of the UE. Thus, as used herein, a radio may include multiple antennas and may be configured to use a respective antenna for communication with at least one RAT. Thus, a radio may include multiple sub-radios, each sub-radio configured to interface to at least one RAT.

RAT 206 and RAT 208 may each be a respective radio access network that allows UE 106 to communicate with network 100. Network 100 may be any network or combination of networks, and in some example embodiments, may be the Internet. For example, in some embodiments, network 100 or a portion thereof, alone or in combination with one or more further networks, may provide a heterogeneous network that may be accessed via multiple radio access networks. In some such embodiments, the heterogeneous network may support network and/or application layer mobility such that a communication session may be transitioned from RAT 206 to RAT 208 and/or vice versa. In other embodiments, UE 106 may support application and/or network layer mobility such that a communication session (e.g., a real time communication session) may be transitioned from RAT 206 to RAT 208 and/or vice versa without interruption.

RAT 206 and RAT 208 may each implement any type of RAT that may be used to support network communication. For example, one or both of RAT 206 and RAT 208 may be cellular RATs. Hence, system 200 may include a radio access network implementing a Long Term Evolution (LTE) RAT, such as various releases of the LTE standard specified by the 3GPP, including various releases of LTE-Advanced (LTE-A), and/or other present or future releases using LTE technology. As another example, system 200 may include a radio access network implementing a third generation (3G) cellular RAT, such as Wideband Code Division Multiple Access (WCDMA) or other Universal Mobile Telecommunications System (UMTS) RAT, such as Time Division Synchronous Code Division Multiple Access (TD-SCDMA); CDMA2000; 1×RTT; and/or the like. As another example, system 200 may include a radio access network implementing a second generation (2G) cellular RAT, such as a Global System for Mobile Communications (GSM) RAT. In some example embodiments, system 200 may include a radio access network implementing a Worldwide Interoperability for Microwave Access (WiMAX) RAT.

In some example embodiments, system 200 may include a radio access network implementing a WLAN RAT. In embodiments in which one of RAT 206 or RAT 208 is a WLAN, the WLAN may implement any appropriate WLAN technology, including, but not limited to a Wi-Fi technology based on an Institute of Electrical and Electronics Engineers (IEEE) 802.11 standard, such as one or more of 802.11 a/b/g/n/ac/ad/etc. It will be appreciated, however, that example embodiments described with respect to the use of Wi-Fi and/or other IEEE-specified WLAN RAT are provided by way of example, and not by way of limitation. In this regard, any appropriate WLAN RAT may be used in addition to or in lieu of IEEE 802.11 in accordance with various example embodiments.

Note also that while a single network may be used to support two different RATs, such as illustrated in the exemplary network configuration shown in FIG. 5A, other network configurations implementing multiple RATs are also possible. As one example, multi-mode base stations capable of simultaneously supporting different RATs (e.g., LTE and GSM, LTE and CDMA2000 1×RTT, and/or any other combination of RATs) might be coupled to a core network (e.g., network 100) that also supports the different cellular communication technologies. In one embodiment, UE 106 may be configured to use a first RAT (e.g., RAT 206) that is a packet data network (i.e., a network implementing packet-switched technology such as LTE) and a second RAT (e.g., RAT 208) that is also a packet data network (e.g., WLAN).

As discussed above, UE 106 may be capable of communicating using multiple RATs, such as those within 3GPP, 3GPP2, or any desired cellular standards. UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

FIG. 5B illustrates a wireless communication system 500 in accordance with some embodiments. System 500 may, for example, be an embodiment of system 200 in which an LTE access network and a Wi-Fi radio access network may be implemented. The system 500 may include UE 106 and LTE network 504 and Wi-Fi network 506.

LTE network 504 may, for example, be an embodiment of RAT 206 and Wi-Fi network 506 may, for example, be an embodiment of RAT 208. Both LTE network 504 and Wi-Fi network 506 may be interfaced with the Internet 514, which may, for example, be an embodiment of network 100. More particularly, LTE network 504 may be interfaced with a serving gateway (SGW) 508, which may in turn be interfaced with a packet data network (PDN) gateway (PGW) 512 via an S5 interface. The Wi-Fi network 506 may be interfaced with an evolved packet data gateway (ePDG) 510, which may be interfaced with the PGW 512 via an S2b interface (e.g., a non-trusted interface). The PGW 512 may, in turn, be interfaced with Internet 514. UE 106 may accordingly access Internet 514 via either or both of LTE network 504 and Wi-Fi network 506.

In some example embodiments, ePDG 510 may only be implemented or used if the Wi-Fi network 506 is not trusted by a network operator (e.g., an operator of the LTE network 504). In such instances, UE 106 may use an IP security (IPSEC) protocol to establish a virtual private network (VPN) tunnel with ePDG 510. If Wi-Fi network 506 is trusted by the operator, then use of ePDG 510 may be omitted in some example embodiments. UE 106 may be configured to tunnel data packets to a WLAN access gateway (WAG) or a WLAN access point using any of a variety of available tunneling protocols, such as, by way of non-limiting example, Generic Routing Encapsulation (GRE). The WAG or WLAN access point may be configured to map received tunneled packets to PGW 512.

In order to maintain session continuity at the network layer, IP sessions may be anchored at PGW 512. Packets sent over cellular or Wi-Fi radio interfaces of UE 106 may be tunneled to PGW 512 over the Wi-Fi radio (or sub-radio) or cellular radio (or sub-radio). PGW 512 may be configured to ensure that the same IP address is assigned to the wireless communication device 502 when it moves from Wi-Fi network 506 to LTE network 504 or vice versa. In this regard, PGW 502 may, for example, ensure that the same IP address is assigned to the logical WLAN interface as may be assigned to the logical cellular interface to support mobility between Wi-Fi network 506 and LTE network 504.

Network mobility can, for example, be handled by PMIP or GTP based solution in accordance with 3GPP specifications. This network mobility may be leveraged by UE 106 to support seamless session mobility at the application layer in accordance with various embodiments, such that a communication session may be moved between the physical cellular interface and the physical WLAN interface to support handover of the communication session between the LTE network 504 and Wi-Fi network 506.

Thus, in one embodiment, UE 106 may be configured to communicate over Wi-Fi network 506 using context information (e.g., Ipv6 address prefix and IID information) assigned to UE 106 by Wi-Fi network 506 (Wi-Fi context information) over the S2b interface (e.g., non-trusted interface). As noted above, the interface may be trusted (e.g., an S2a interface) or non-trusted (e.g., an S2b interface). UE 106 may initiate a handover operation (e.g., an application layer or network layer handover) from Wi-Fi network 506 to LTE network 504 and in response to the handover operation, communicate over LTE network 504 using the Wi-Fi context information. UE 106 may continue to use the Wi-Fi context information at least during a time duration that may span a time period during which UE 106 acquires context information usable for communication over LTE network 504 (LTE context information).

In one embodiment, UE 106 may establish connectivity with LTE network 504 as part of the handover operation. Thus, UE 106 may establish a PDN connection with LTE network 504 and configure an IP address (e.g., via router solicitation (RS) and router advertisement (RA) messages). In some embodiments, UE 106 may communicate over LTE network 504 using the Wi-Fi context information subsequent to establishing connectivity over LTE network 504 and prior to acquiring and/or being assigned LTE context information. Note that the Wi-Fi context information may or may not be equivalent to the LTE context information. Thus, if UE 106 determines that the Wi-Fi context information is equivalent to the LTE context information, the UE may continue to use the Wi-Fi context information to communicate over LTE network 504 and the handover may be performed at the network layer (i.e., the handover operation may be a network layer handover operation). In such instances, the handover operation may be seamless and allow for uninterrupted communications. Alternatively, if the LTE context information is not equivalent to the Wi-Fi context information, UE 106 may use the LTE context information to communicate over LTE network 504 and the handover may be performed at the application layer (i.e., the handover operation may be an application layer handover operation).

Handover won't be seamless if context acquired over cellular is different from WiFi. In order to support seamless handover, at least prefix information acquired over cellular network must be same as the prefix information used over WiFi. If prefix acquired over cellular network is not same as prefix that is already being used over WiFi, Cellular chip will notify application processor that context has changed and the application will have to recover changed IP address context. Please calrify this in other places as well.

Figure 6A:
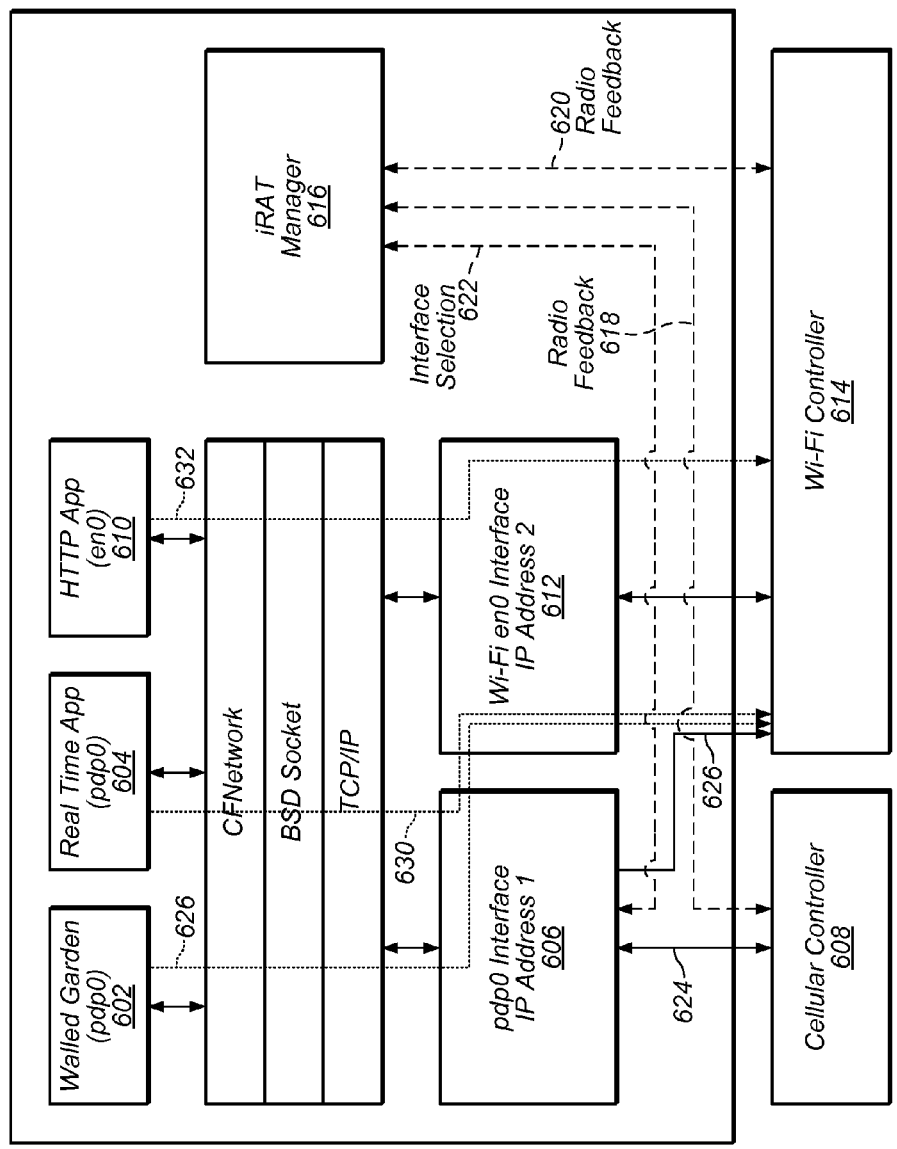
FIGS. 6A-6B illustrate routing of data packets within a UE in accordance with some embodiments.
Figure 6B:
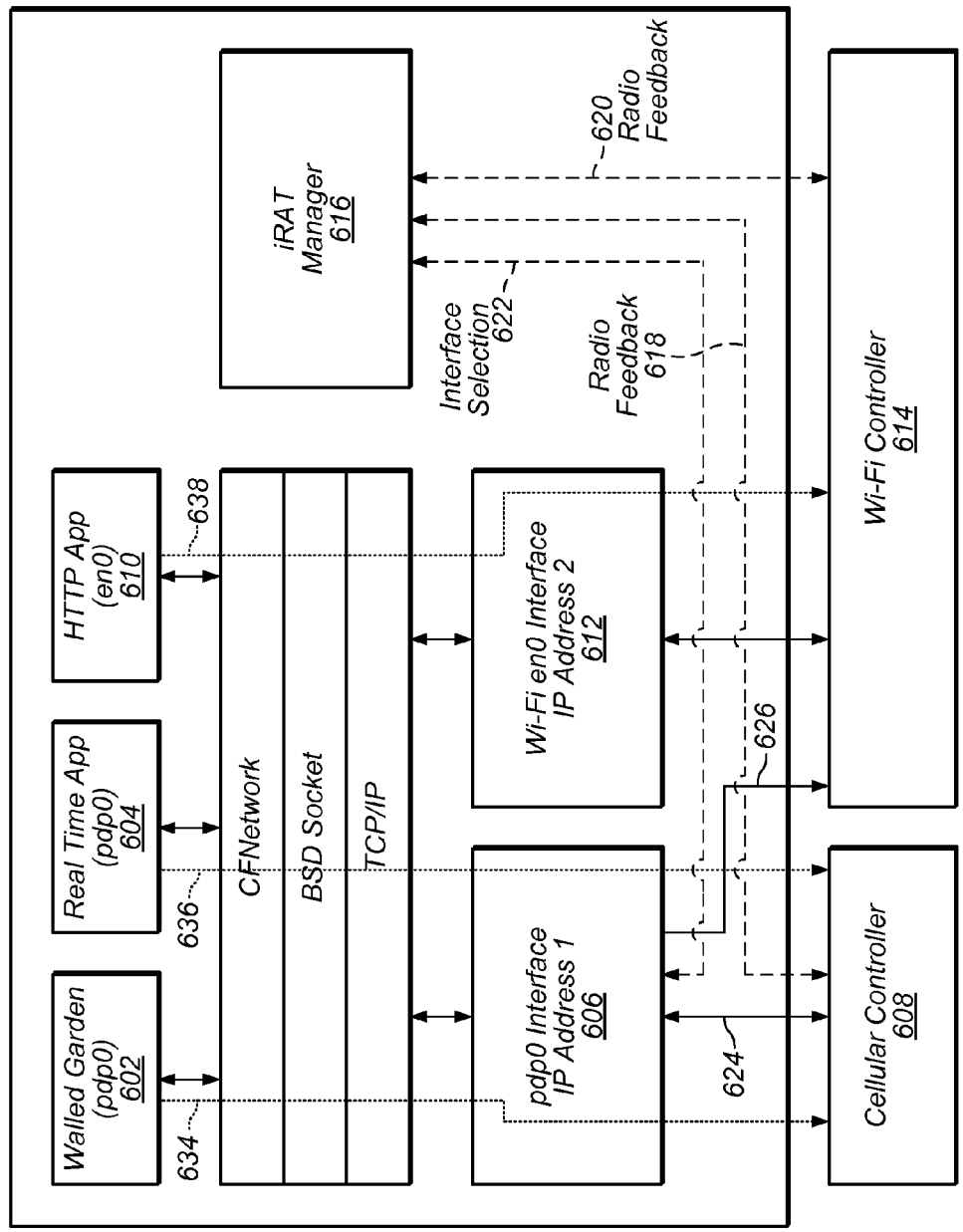

FIGS. 6A-6B—Data Packet Routing

FIGS. 6A-6B illustrate routing of data packets within a multi-mode device architecture in accordance with some example embodiments. More particularly, FIGS. 6A-6B illustrate routing of data packets within a multi-mode device, such as UE 106, that may be operating within a wireless communication system, such as system 200 and/or system 500, in accordance with some example embodiments. The device architecture of FIGS. 6A and 6B may accordingly be implemented on a UE, such as UE 106. It will be appreciated, however, that the architecture of FIGS. 6A and 6B is provided by way of example, and not by way of limitation, such that alternative architectures are contemplated within the scope of the disclosure.

In the example of FIGS. 6A and 6B, applications 602 (e.g., a walled garden application such as, for example, an IP multimedia subsystem (IMS) call provided by a carrier such as a call over an LTE radio (VoLTE) or a call over a Wi-Fi Radio (Wi-Fi call)) and 604 (e.g., a real time application, such as FaceTime®) may be anchored to pdp0 interface 606 and execute on an application processor of the UE. pdp0 interface 606 may be a logical cellular interface associated with cellular controller 608 (e.g., a baseband processor), which may provide a physical cellular interface. HTTP application 610, also executing on the application processor of the UE, may be bound to en0 interface 612, which may be associated with Wi-Fi controller 614, which may provide a physical WLAN interface. In some example embodiments, applications 602 and 604 may not be exposed to en0 interface 612 and/or to Wi-Fi controller 614.

iRAT (inter-radio access technology) manager 616 may execute on, or be a part of, the application processor, and may be configured to control routing of packets sent to pdp0 interface 606 by applications 602 and 604 to Wi-Fi controller 614 in an instance in which the communication sessions for applications 602 and 604 have been moved to Wi-Fi controller 614 for transmission over a WLAN. In some example embodiments, iRAT manager 616 may be configured to utilize radio feedback 618 that may be received from cellular controller 608 and/or radio feedback 620 that may be received from Wi-Fi controller 614 to determine which physical interface to use for a communication session. Radio feedback 618 may be indicative of conditions on a cellular access network, such as LTE network 504, which may be measured or otherwise observed by cellular controller 608. Similarly, radio feedback 620 may be indicative of conditions on a WLAN, such as Wi-Fi network 506, which may be measured or otherwise observed by Wi-Fi controller 614. Radio feedback 618 and 620 may, for example, be indicative of a measured or otherwise observed channel quality, network loading conditions, and/or other wireless metrics that may be observed for a cellular access network and/or for a WLAN. iRAT manager 616 may be further configured to consider additional or alternative factors, such as a radio interface selection policy (or policies), when making an interface selection decision.

iRAT manager 616 may be configured to provide interface selection and routing information 622 to pdp0 interface 606 to control routing of data sent to pdp0 interface 606 by applications 602 and 604. Thus, for example, when iRAT manager 616 determines that data for application 602 and/or application 604 should be sent over a cellular access network, iRAT manager 616 may cause pdp0 interface 606 to send the data via path 624 to cellular controller 608 for transmission over the cellular access network. As a further example, when iRAT manager 616 determines that data for application 602 and/or application 604 should be sent over a WLAN, iRAT manager 616 may cause pdp0 interface 606 to send the data via path 626 to Wi-Fi controller 614 for transmission over the WLAN. iRAT manager 616 may accordingly be configured to make a handover decision (e.g., based at least in part on radio feedback 618, radio feedback 620, a radio interface selection policy (or policies), and/or other factors), and may control handover of communication sessions for applications 602 and 604 between cellular controller 608 and Wi-Fi controller 614 by controlling routing of data sent to pdp0 interface 606 for communication sessions anchored to pdp0 interface 606.

In one embodiment, iRAT manager 616, or the application processor executing iRAT manager 616, may be configured to communicate via Wi-Fi controller 614 using context information assigned by the WLAN (i.e., Wi-Fi context information) and initiate a handover operation from the WLAN to the cellular access network. Accordingly, in response to initiation of the handover operation, communication via cellular controller 608 over the cellular access network may be performed using the Wi-Fi context information for at least a first time period. During the first time period, cellular controller 608 may activate acquisition of cellular context information useable for communication over the cellular access network. Further, cellular controller 608 may compare the Wi-Fi context information to the cellular context information. If the Wi-Fi context information is the same as (i.e., equivalent to) the cellular context information, cellular controller 608 may continue to use the Wi-Fi context information for communications (i.e., active communication session) over the cellular access network. If the Wi-Fi context information is not the same as the cellular context information, cellular controller 608 may use the cellular context information for communications over the cellular access network.

In one embodiment, cellular controller 608 may determine that the cellular context information may be sufficient to support end-to-end routing of user plane traffic (i.e., data) of an active communication session. Note that the cellular context information may be sufficient to support end-to-end routing when at least the prefix information (e.g., IPv6 prefix information) that may be included in the cellular context information is the same as the prefix information that may be included in the Wi-Fi context information. Additionally, in some instances cellular controller 608 may determine that cellular context information may not be sufficient to support end-to-end routing of user plan traffic for the active communication session. In other words, the active communication session may be interrupted (i.e., fail or break). Thus, cellular controller 608 may determine that at least the prefix information that may be included in the cellular context information is not the same as the prefix information included in the Wi-Fi context information and, in response, cellular controller 608 may notify the application processor about a change in context such that an application running on the application processor may recover and continue the active communication session without interruption.

Thus, FIG. 6A illustrates an example of routing data packets in an instance in which Wi-Fi controller 614 is active such that a connection to a WLAN is available. As illustrated in FIG. 6A, data packets sent by application 602 and/or application 604 when the Wi-Fi controller 614 is active may be routed from the application to the socket, to the TCP/IP stack, to pdp0 interface 606, and then to Wi-Fi controller 614. In this regard, iRAT manager 616 may be configured to transparently route data packets for applications 602 and 604 based on which interface(s) is active and/or which interface is preferred at a given point in time, while from the perspective of applications 602 and 604, the applications may be anchored to pdp0 interface 606 and may be unaware of the usage of Wi-Fi controller 614 for transmission of their communication sessions. Data packets sent by application 610 may be routed from application 610 to the socket, to the TCP/IP stack, to en0 interface 612, and to Wi-Fi controller 614 for transmission over the WLAN.

FIG. 6B illustrates an example of routing data packets in an instance in which Wi-Fi controller 614 is not active (e.g., where there is not an available WLAN connection), or in an instance in which usage of the cellular interface is preferred (e.g., due to observed network conditions, a policy, and/or other factors that may be considered in selecting a physical interface). As illustrated in FIG. 6B, data packets sent by application 602 and/or application 604 may be routed from the application to the socket, to the TCP/IP stack, to pdp0 interface 606, and then to cellular controller 608 for transmission over a cellular access network.

Figure 7:
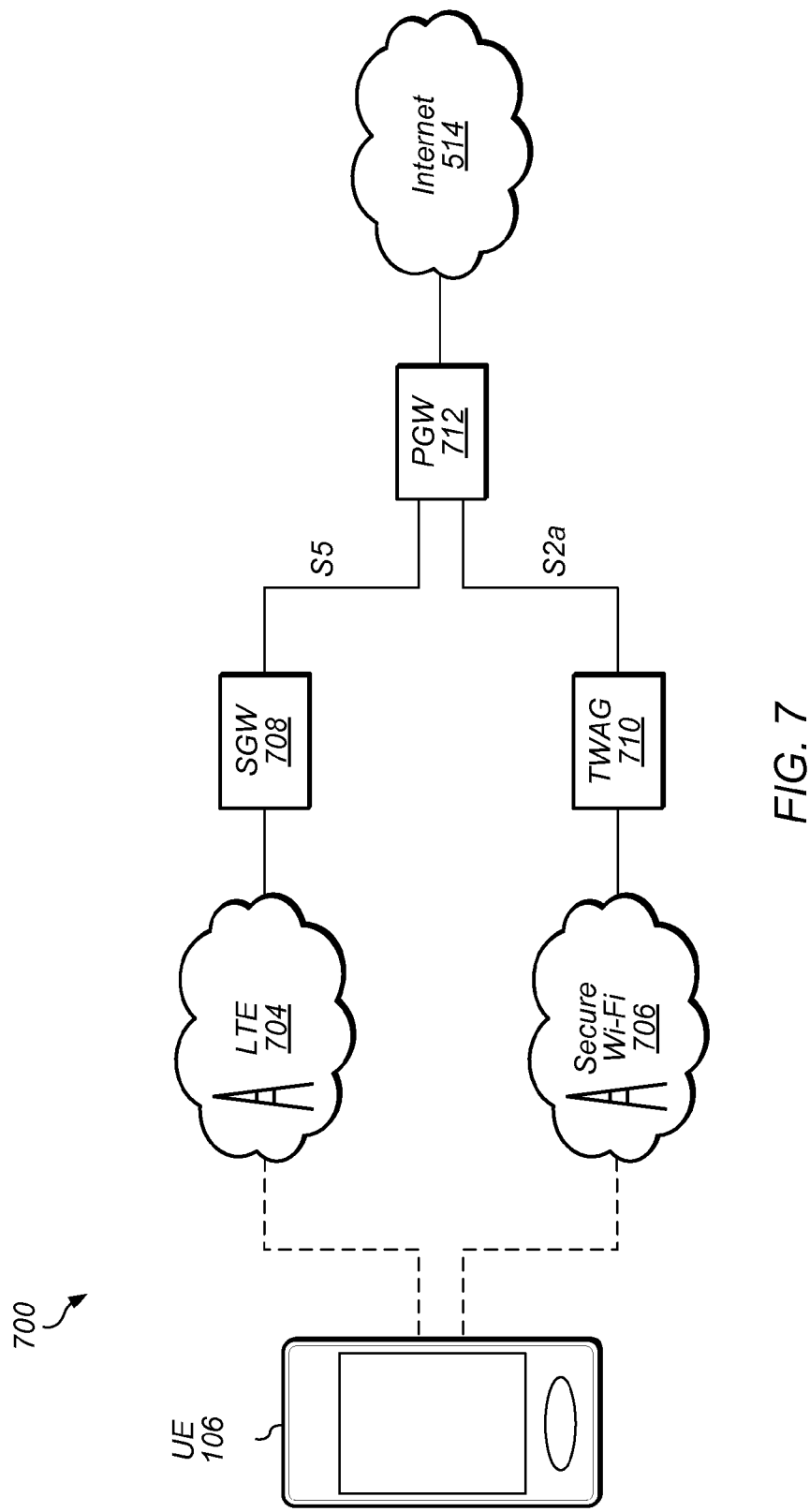
FIG. 7 illustrates an architecture of a wireless communication system in accordance with some example embodiments.

FIG. 7—Wireless Communication System Architecture

FIG. 7 illustrates an architecture of a wireless communication system 700 in accordance with some example embodiments. Secure Wi-Fi network 706 may be a trusted network. The Wi-Fi access point/trusted WLAN access gateway (TWAG) 710 may use a GTP (S2a) interface to connect to PGW 712. However, present 3GPP specifications (e.g., release 11 of the 3GPP specification) do not define a signaling mechanism from the network to a wireless communication device to indicate if the network is capable of supporting a network mobility protocol, such as S2a Mobility based on GTP (SaMOG), so the wireless communication device may not be able to offload applications, such as walled garden applications, from a cellular network to a WLAN.

UE 106 in accordance with some embodiments may be configured to proactively determine it is connected to a SaMOG (e.g., a SaMOG according as defined in release 11 of the 3GPP specification) network and/or other network supporting network mobility of a communication session between radio access networks. For example, in some example embodiments, the UE 106 may be configured to perform a reverse domain name service (DNS) lookup of an IP address on the secure Wi-Fi network 706 to identify who has assigned the Wi-Fi address. If the IP address has been assigned by an operator of the cellular network (e.g., the operator of the LTE network 704), UE 106 may assume that it is on a trusted network that supports SaMOG and/or other suitable network mobility protocol. UE 106 may additionally or alternatively be configured to compare the IP address assigned on the secure Wi-Fi network 706 with that assigned on LTE network 704. If both IP addresses belong to the same address pool or are identical, UE 106 may be configured to assume that it is on a trusted network that supports SaMOG and/or other suitable network mobility protocol.

UE 106 may additionally or alternatively be configured to attempt to connect to a known server on the cellular network via secure Wi-Fi network 706. If the attempt is successful, UE 106 may be configured to assume that it is on a trusted network that supports SaMOG and/or other suitable network mobility protocol. If, however, the attempt is not successful, UE 106 may be configured to infer that it is not connected to a secure Wi-Fi network and may be configured to use the IP address assigned by the non-secure Wi-Fi network (non-secure IP address) to communicate over LTE network 704 during a handover from the non-secure Wi-Fi network to LTE network 704. UE 106 may continue to use the non-secure IP address while acquiring a secure IP address from LTE network 704. In other words, UE 106 may use the non-secure IP address during a time period for acquiring a secure IP address. In this manner, UE 106 may seamlessly transition from the non-secure Wi-Fi network to LTE network 704 without interruption of the communication session.

Figure 8:
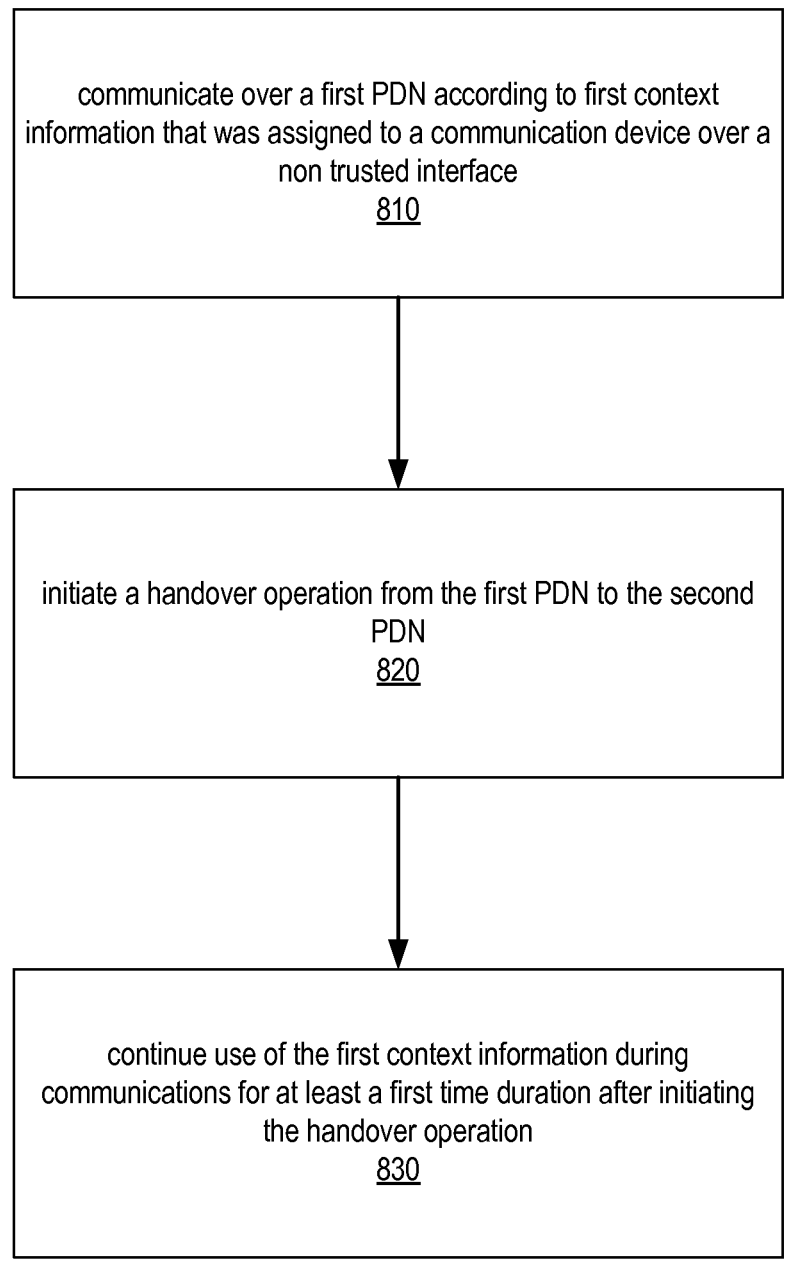
FIG. 8 shows flowchart diagrams illustrating embodiments of a method for performing handover between packet data networks.

FIG. 8—Method for Performing Application Layer Handover

FIG. 8 illustrates an exemplary embodiment of a method for performing seamless handover on a wireless communication device (i.e., a UE) from a first packet data network (PDN) (i.e., a first packet-switched network) to a second PDN (i.e., a second packet-switched network). The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 810, the wireless communication device may communicate over the first PDN according to first context information that was assigned to the communication device over a non-trusted interface (e.g., an S2b interface). In one embodiment, the context information may include IPv6 prefix and IID address information. Additionally, in some embodiments, the first PDN may be a wireless local area network (WLAN) such as a Wi-Fi network, for example, and the second PDN may a cellular network such as LTE or LTE-Advanced, for example.

At 820, the wireless communication device may initiate a handover operation from the first PDN to the second PDN. In one embodiment the handover operation may be an application layer handover operation. In another embodiment the handover operation may be a network layer handover operation.

In one embodiment, the wireless communication device (e.g., an application processor of the wireless communication device) may activate acquisition of second context information usable by the wireless communication device for communication over the second PDN in response to initiation of the handover operation. In such embodiments, the wireless communication device may include a first controller (e.g., a cellular controller or baseband processor) configured to facilitate communication of the wireless communication device over the second PDN. Thus, the wireless communication device may notify the first controller about the first context information during the activating of the acquisition of the second context information. Further, the communication device may include a first interface configured to interoperate with the first controller to facilitate communications of the wireless communication device over the second PDN and the first controller may auto configure the first interface using the first context information in response to the notification. In other words, the wireless communication device may continue to use the first context information to route data packets to the first interface for communications over the second PDN. Further, the first controller may use the first context information for communications over the second PDN during establishment of second context information for communications over the second PDN.

In one embodiment, the wireless communication device may establish connectivity over the second PDN in response to the initiation of the handover operation. Accordingly, the wireless communication device may conduct the communications over the second PDN in response to establishment of connectivity over the second PDN.

In one embodiment, the wireless communication device may acquire second context information usable for communicating over the second PDN in response to initiation of the handover operation and compare the first context information with the second context information. If the first context information and the second context information are equivalent (i.e., the same), the wireless communication device may continue using the first context information during the communications.

Alternatively, if the first context information and the second context information are not equivalent (i.e., not the same), the wireless communication device may continue the communications (i.e., communication session) using the second context information.

At 830, the wireless communication device may continue use of the first context information during communications for at least a first time duration after initiating the handover operation. In one embodiment, the first time duration may include a time period for the wireless communication device to acquire and/or be assigned second context information for communication over the second PDN.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for handover on a wireless communication device, the method comprising the wireless communication device:
    communicating over a first packet data network (PDN) according to first context information that was assigned to the wireless communication device over a non-trusted interface;
    determining, based at least in part on first radio feedback acquired from the first PDN and second radio feedback acquired from a second PDN, to handover the communicating from the first PDN to the second PDN;
    initiating, in response to said determining, a handover operation from the first PDN to the second PDN;
    notifying a first controller comprised in the wireless communication device about the first context information, wherein the first controller is configured to facilitate communication of the wireless communication device over the second PDN; and
    continuing use of the first context information during communications over the second PDN for at least a first time duration after initiating the handover operation.

2. The method of claim 1, wherein the handover operation is an application handover operation or a network layer handover operation.

3. The method of claim 1, further comprising:
activating acquisition of second context information usable by the wireless communication device for communicating over the second PDN, responsive to initiating the handover operation.

4. The method of claim 3,
wherein said notifying the first controller about the first context information comprises notifying the first controller about the first context information during the activating of the acquisition of the second context information.

5. The method of claim 4, wherein the wireless communication device comprises a first interface configured to interoperate with the first controller to facilitate communication of the wireless communication device over the second PDN, the method further comprising the first controller:
auto configuring the first interface using the first context information, responsive to the notifying.

6. The method of claim 1, further comprising the wireless communication device:
establishing connectivity over the second PDN, responsive to the initiating the handover operation; and
conducting the communications over the second PDN, responsive to the establishing.

7. The method of claim 1, further comprising the wireless communication device:
acquiring second context information usable by the wireless communication device for communicating over the second PDN, responsive to the initiating the handover operation.

8. The method of claim 7, further comprising the wireless communication device:
comparing the first context information with the second context information; and
responsive to the comparing:
continue using the first context information during the communications if the comparing indicates that the first context information and the second context information are the same; and
continue the communications using the second context information if the comparing indicates that the first context information and the second context information are not the same.

9. The method of claim 1, wherein the first PDN is a wireless local area network and the second PDN is a cellular network.

10. A user equipment (UE) device, the UE comprising:
a radio, comprising one or more antennas for performing wireless communication over at least a first packet data network (PDN) and a second PDN; and
processing circuitry comprising an application processor and a first controller, wherein the first controller is configured to facilitate communication of the UE over the second PDN, and wherein the processing circuitry is coupled to the radio and configured to interoperate with the radio to:
communicate over the first PDN according to first context information that was assigned to UE over a non-trusted interface;
determine, based at least in part on first radio feedback acquired from the first PDN and second radio feedback acquired from the second PDN, to handover a communication session from the first PDN to the second PDN;
initiate, in response to the determining, a handover operation from the first PDN to the second PDN, wherein the application processor is configured to notify the first controller about the first context information as part of the handover operation; and
communicate over the second PDN using the first context information for at least a first time duration, responsive to the handover operation.

11. The UE of claim 10, wherein as part of the handover operation the processing circuitry is configured to further interoperate with the radio to:
acquire second context information usable by the UE for communication over the second PDN.

12. The UE of claim 10,
wherein the application processor is further configured to execute one or more applications on the UE.

13. The UE of claim 10, wherein the radio comprises a first interface configured to interoperate with the first controller to facilitate communication of the UE over the second PDN;
wherein the first controller is configured to auto configure the first interface using the first context information in response to being notified by the application processor about the first context information; and
wherein the first interface is configured to interoperate with the first controller to cause the UE to communicate over the second PDN responsive to the first controller auto configuring the first interface.

14. The UE of claim 10, wherein the processing circuitry is configured to interoperate with the radio to:
establish connectivity over the second PDN as part of the handover operation; and
communicate over the second PDN using the first context information subsequent to having established connectivity over the second PDN and prior to acquiring second context information usable by the UE to communicate over the second PDN.

15. The UE of claim 10, wherein the processing circuitry is configured to interoperate with the radio to:
acquire second context information usable by the UE for communicating over the second PDN, as part of the handover operation;
determine whether the first context information and the second context information are the same;
continue using the first context information while communicating over the second PDN if it was determined that the first context information and the second context information are the same; and
use the second context information while communicating over the second PDN if it was determined that the first context information and the second context information are not the same.

16. A non-transitory memory element (NME) configured to store instructions executable by processing circuitry to cause a mobile device to:
communicate over a first packet data network (PDN) according to first context information that was assigned to the mobile device over a non-trusted interface;
cause an application processor within the mobile device to notify a first controller within the mobile device about the first context information as part of a handover operation;
determine, based at least in part on first radio feedback acquired from the first PDN and second radio feedback acquired from the second PDN, to handover a communication session from the first PDN to the second PDN;
initiate, in response to the determining, the handover operation from the first PDN to a second PDN, wherein the first controller is configured to facilitate communication of the mobile device over the second PDN; and communicate over the second PDN using the first context information for at least a first time duration, responsive to the handover operation.

17. The NME of claim 16, wherein the instructions are further executable by the processing circuitry to cause the mobile device to:

acquire, as part of the handover operation, second context information usable by the mobile device for communication over the second PDN.

18. The NME of claim 17, wherein the instructions are further executable by the processing circuitry to cause the mobile device to:

determine whether the first context information and the second context information are the same;

continue using the first context information while communicating over the second PDN if it was determined that the first context information and the second context information are the same; and use the second context information while communicating over the second PDN if it was determined that the first context information and the second context information are not the same.

19. The NME of claim 16, wherein the instructions are further executable by the processing circuitry to:

cause the application processor to execute one or more applications on the mobile device.

20. The NME of claim 16, wherein the instructions are further executable by the processing circuitry to:

cause the first controller to auto configure a first interface within the mobile device according to the first context information in response to being notified by the application processor about the first context information; and cause the first controller to interoperate with the first interface to have the mobile device communicate over the second PDN responsive to the first controller auto configuring the first interface.

* * * * *